United States Patent

[11] 3,609,379

| | | |
|---|---|---|
| [72] | Inventor | Herbert John Hildebrandt<br>Baldwinsville, N.Y. |
| [21] | Appl. No. | 824,162 |
| [22] | Filed | May 13, 1969 |
| [45] | Patented | Sept. 28, 1971 |
| [73] | Assignee | General Electric Company |

[54] PHOTOELECTRIC DROP SENSING AND TIMING CONTROL FOR INTRAVENOUS FEED AND OTHER FLOW CONTROL APPLICATIONS
14 Claims, 7 Drawing Figs.

| [52] | U.S. Cl. | 250/218,<br>222/52 |
|---|---|---|
| [51] | Int. Cl. | G01n 21/26 |
| [50] | Field of Search | 250/218;<br>222/52, 59, 70, 76 |

[56] References Cited
UNITED STATES PATENTS

| 2,490,627 | 12/1949 | Hofberg | 250/218 |
|---|---|---|---|
| 3,158,163 | 11/1964 | Claudy | 222/59 |
| 3,242,794 | 3/1966 | Crane | 250/218 |
| 3,252,623 | 5/1966 | Corbin et al. | 222/76 |
| 3,445,677 | 5/1969 | Leftwich | 250/218 |

Primary Examiner—James W. Lawrence
Assistant Examiner—T. N. Grigsby
Attorneys—Carl W. Baker, Frank L. Neuhauser, Oscar B. Waddell and Joseph B. Forman ABSTRACT: This disclosure is of a fluid flow rate control for intravenous feed and like applications wherein flow occurs in dropwise fashion. Drops are sensed photoelectrically by interruption of a light beam incident upon a photocell, the resulting fluctuations in output of the cell being detected and utilized for closed loop control of a flow adjustment device operative to correct any drop timing error detected. The control circuitry described includes means enabling discrimination between discrete drops and a steady stream or column of liquid as occasionally is experienced in intravenous feed apparatus, and means enabling discrimination also as between the primary or main drop and small secondary drops which sometimes form with and trail immediately after the main drop and which, if sensed, introduce errors into the drop timing measure obtained. For purposes of shutting off flow just prior to exhaustion of the fluid supply, means are provided for sensing fluid level at some point in the system indicative of the approach of this condition, such sensing being accomplished by photoelectric means arranged to afford reliable indication of fluid level irrespective of the transparency or opacity of the particular fluid involved. Means also are provided for shutting off flow in the event of photosensor light source failure.

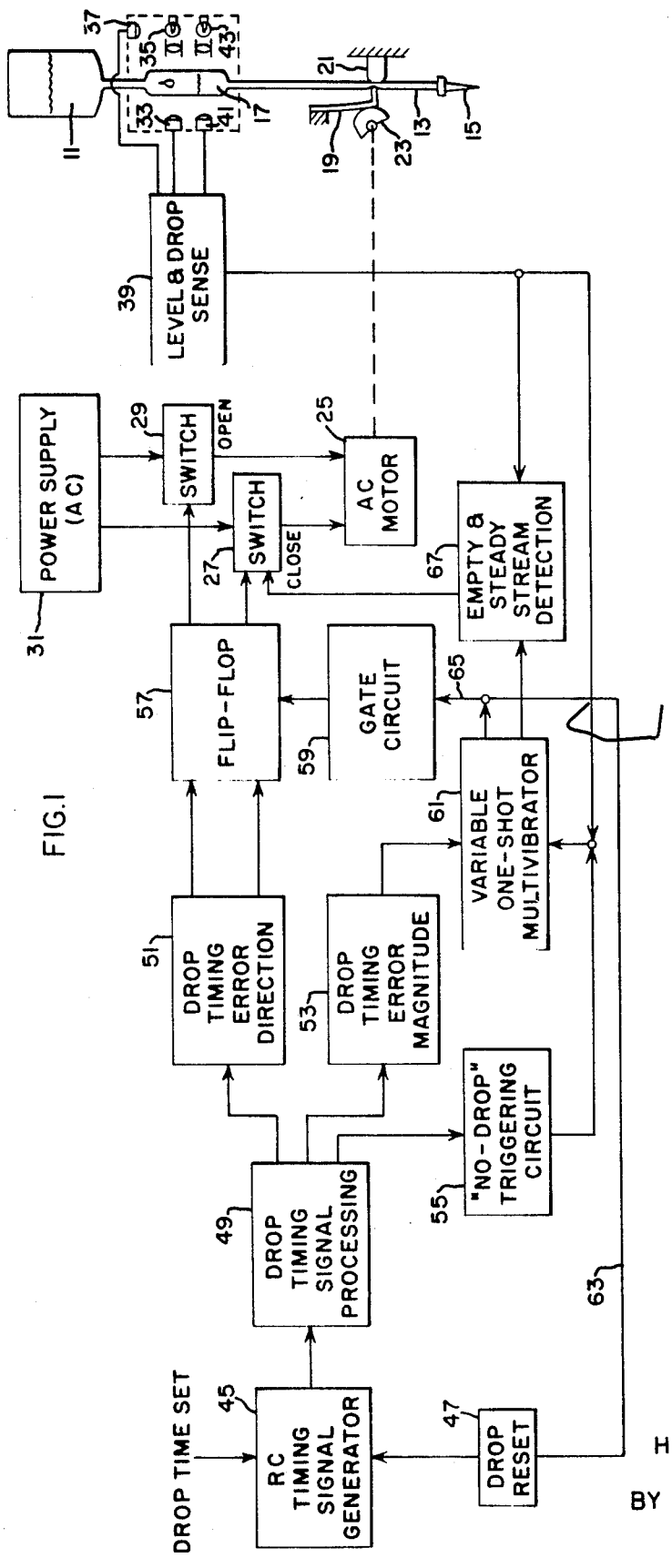

INVENTOR:
HERBERT J. HILDEBRANDT,
BY C.W. Baker
HIS ATTORNEY.

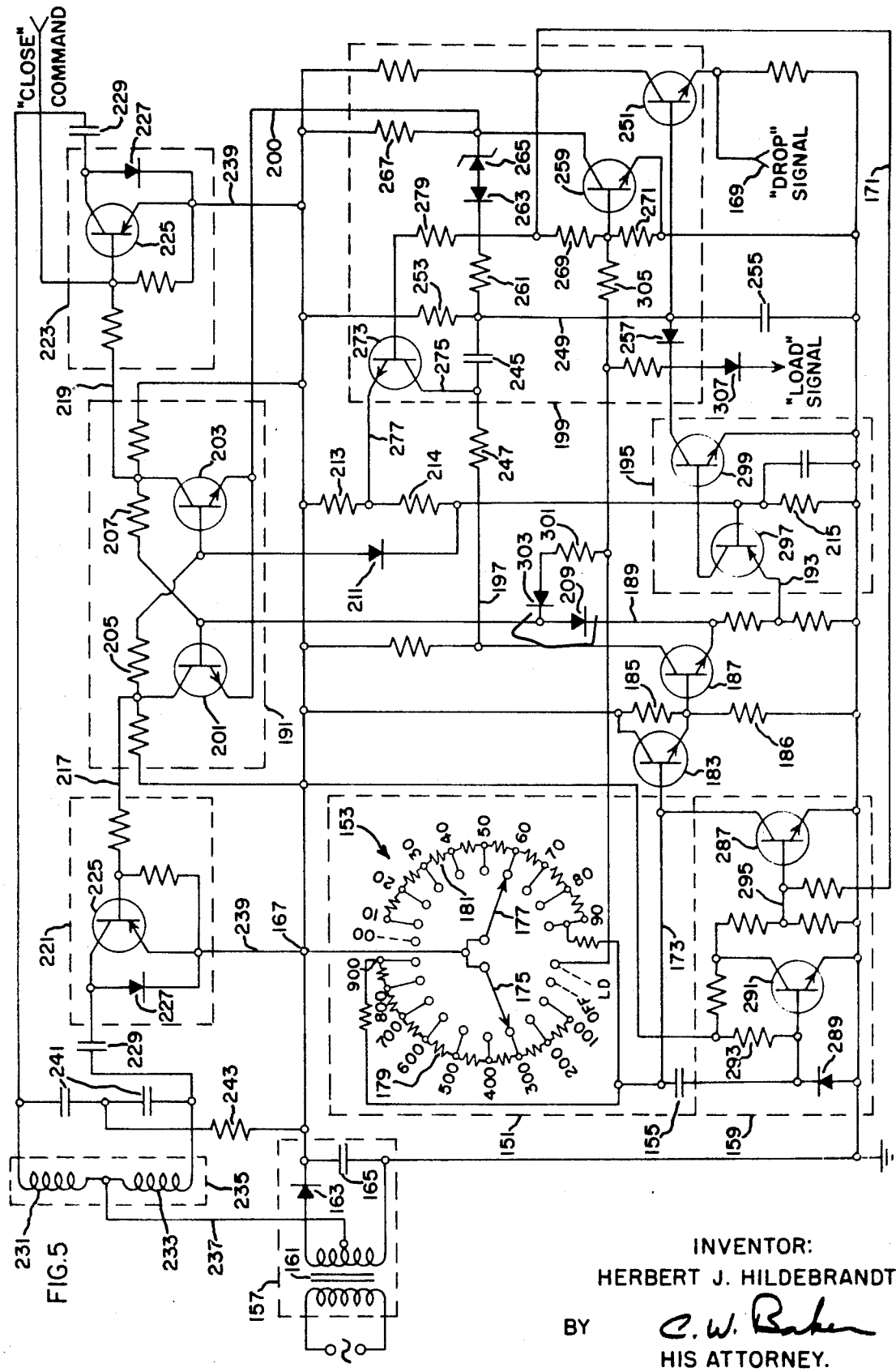

"DROP" SIGNAL

"LOAD" SIGNAL

"CLOSE" COMMAND

INVENTOR:
HERBERT J. HILDEBRANDT,
BY C.W. Baker
HIS ATTORNEY.

PHOTOELECTRIC DROP SENSING AND TIMING CONTROL FOR INTRAVENOUS FEED AND OTHER FLOW CONTROL APPLICATIONS

BACKGROUND OF THE INVENTION

This invention relates generally to photoelectric sensor and control systems and more specifically to such systems adapted to provide control of fluid flow in intravenous feeding and other systems in which flow occurs in drop-wise fashion. Still more specifically, the invention relates to drop timing control systems of the general kind described in the copending application Ser. No. 684,885, filed June 27, 1967, in the names of Herbert John Hildebrandt and Tage Peter Sylvan. The intravenous feed system described in that application utilizes a capacitive-type sensor for detecting drops, and mentions as the basis for preference of this sensor over photoelectric sensors, the relative complexity of the latter and the care which would be required with conventional photoelectric sensors to assure proper alignment of the light source, photocell and drop chamber.

The present invention has as its principal objective the provision of drop sensing and timing control systems including photoelectric sensors and associated circuitry which avoid these and other weaknesses of prior such systems, and which at the same time afford significant additional advantages. Among these is the ability to discriminate as between normal drops and certain flow abnormalities noted in some applications of intravenous flow feeding devices.

Specifically, depending upon the configuration of the particular drop chamber with which used, and depending also on the characteristics of the particular fluid being fed, it has been found under some circumstances that instead of single drops falling, clear of any accompanying fluid, one or more secondary drops may form with and trail immediately behind each primary drop. These secondary drops generally are so small in size and number as not to seriously degrade the accuracy of fluid flow rate control, unless they are sensed and inputted to the control in the same fashion as normal drops. The photoelectric sensor systems of this invention include means rendering them insensitive to such secondary drops so as not to respond thereto, and these same means prevent multiple responses to a single drop due to scintillation or other optical effect tending to modulate the sensor output as the drop falls past.

Another flow abnormality sometimes noted particularly in intravenous feed applications in which injection is through a relatively large bore cannula rather than the usual small bore needle, is the formation of a column or steady stream of liquid through the drop chamber instead of the desired train of distinct drops. To provide automatic correction for this condition the sensor should be adapted to respond to it by providing an input such as would drive the flow control in a direction towards cutoff, to thus reduce flow rate back down to a level at which discrete drops will form.

An additional capability often required of intravenous feed control systems, is that of measuring the level of the pool of liquid which during normal operation stands in the bottom of the drop chamber or, more accurately, of sensing the fall in level of this liquid which accompanies the emptying of the supply flask, and responding to any fall in level by clamping off the flow line tubing. If the empty flask condition can be sensed and the control made to respond to it by clamping off the flow line sufficiently quickly that the entire line below the drop chamber remains filled with liquid, then a new supply flask may be substituted without necessity to bleed the line and without disturbance of the patient by removal and reinsertion of the injection needle, as is sometimes necessary if the flow line is permitted to empty.

One troublesome difficulty in achieving this level-sensing function photoelectrically is introduced by the differences in transparency of the various kinds of liquids which the apparatus may be called upon to handle. Usually the light source and photocell can readily be arranged in conventional manner to sense changes in level of a liquid which is opaque or at least partially so, as in the case of whole blood. When thus arranged these conventional photoelectric systems would not also provide reliable sensing of completely transparent liquids such as distilled water, however, so the adaptability of systems relying upon them for empty bottle sensing would in this way necessarily be compromised.

The photoelectric sensors of the present invention provide new and improved capabilities in respect to these several noted problem areas, providing good accuracy of flow rate control even with fluids tending to form secondary drops, good sensitivity to and control of the steady stream problem even in cases in which the stream is relatively thin as in the so-called "minidrip" systems widely used in pediatric work, and good reliability of empty flask detection with any common liquid irrespective of its transparency or opacity. While providing these and other performance and safety advantages the systems of this invention afford the relative simplicity of structure and circuitry which is desirable in the interests of reliability and cost, and afford also an ease and versatility of use enabling application to a wide variety of intravenous feed and other fluid flow control needs.

SUMMARY OF THE INVENTION

In brief, control systems in accordance with this invention incorporate photoelectric drop sensor means including a light source and a photocell operative to output an electrical signal upon passage of each drop, including both primary and secondary drops, as the drop falls through the light beam and shadows the photocell. To avoid control inaccuracies due to response to drop signals resulting from secondary drops, drop pulse generating means are provided including means for disabling its pulse generating function after each primary drop, through a time period which is longer than that characteristically separating each primary drop and its associated secondary drops but shorter than the time period between successive primary drops even at the highest selectable flow rate. In this way the system remains able to sense and respond in normal fashion to all primary drops over the entire selectable range of flow rates, yet will not respond to any secondary drops which trail their associated primary drops more closely than this minimum primary drop time spacing. The limitation thus imposed on the maximum frequency or repetition rate of the drop pulse signal permits also the use of pulse repetition rate as a basis for discrimination between this and another pulsed signal which is generated in response to any of several operating irregularities including (1) steady stream formation, (2) emptying of the supply flask and (3) failure of a light source.

More specifically, the system includes circuitry which preferably is in substantial part common to the drop pulse generator, and which is responsive to any relatively long term change in photocell output, such as would result from the initiation and continuance of a steady stream condition, to generate a series of pulses at a pulse repetition rate or frequency higher than any pulse rate which would be experienced even at the highest available flow rate setting. The circuitry generating this high repetition rate pulse also may be triggered by light failure sensing means or by input from a second photocell arranged to sense the emptying of the fluid supply flask, the signal produced in response to either of these conditions being introduced into the drop pulse signal generator in a manner to yield a pulse output at high repetition rate similar to that of the steady stream condition. The pulse generator output is processed in a pulse rate or frequency discriminator which is responsive to an abnormally high pulse rate such as results from steady stream condition, light failure or empty flask condition, to produce an output control or command signal which would drive the system to "off" condition or, in the case of the steady stream condition, towards the "off" condition sufficiently far that the fluid flow rate is cut back to a level such that drops may again form, at which point normal control is restored.

In an alternative embodiment of the invention also described, the signals indicative of steady stream, light failure and empty flask conditions are provided in the form of DC voltages. Such voltages are readily distinguishable from the drop signal, which is of pulse character, and may be used to drive the system toward "off" condition in generally the same manner as in the first embodiment.

BRIEF DESCRIPTION OF THE DRAWINGS

The foregoing and other objects, features and advantages of the invention will become more fully apparent and the invention further understood by reference to the following detailed description when read in conjunction with the accompanying drawings, wherein:

FIG. 1 is a block diagram of an intravenous fluid feeding system in accordance with the invention;

FIG. 5 is a schematic circuit diagram of flow rate setting, drop timing error sensing and motor control circuits suitable for use in the system of FIG. 1;

FIG. 6 is a schematic circuit diagram of a drop signal responsive circuit operative to provide a "close" command to the control circuit of FIG. 4 upon occurrence of certain flow abnormalities.

DESCRIPTION OF PREFERRED EMBODIMENTS

Figure 4:
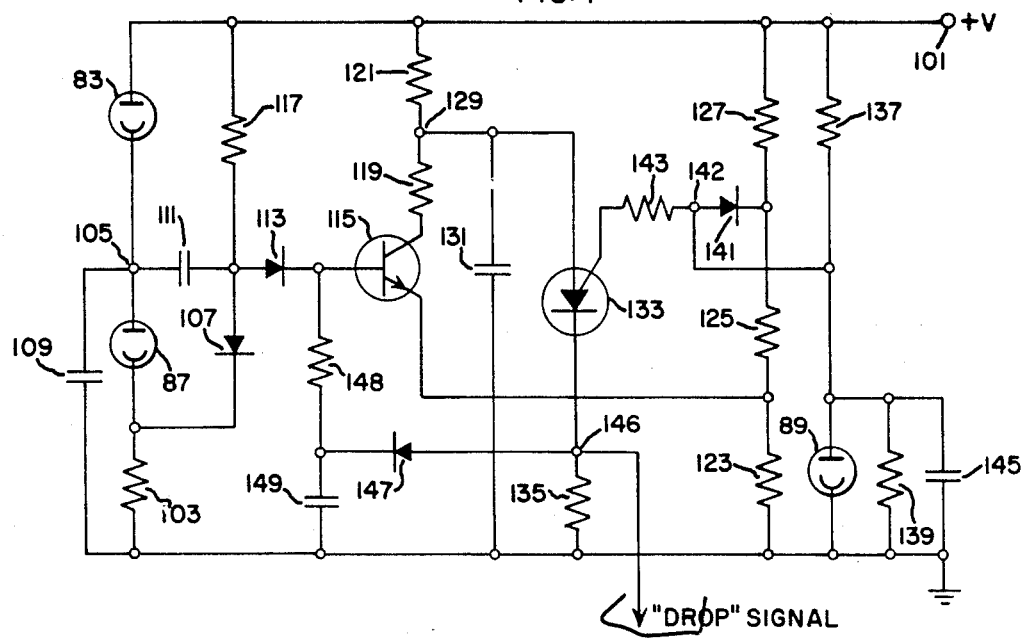
FIG. 4 is a schematic circuit diagram of a drop and level sensor with drop signal output suitable for use in the system of FIG. 1.

With continued reference to the drawings, wherein like reference numerals have been used throughout to designate like elements, FIG. 1 illustrates a preferred embodiment of the invention as applied to an intravenous flow feeding system. This system comprises a supply flask 11 which connects through a length of flexible rubber or plastic tubing 13 to the injection needle 15, a tubular drop chamber 17 of glass or transparent plastic being interposed in this flow line preferably immediately adjacent the flask 11 as shown. In present hospital practice the elements just described are of single-use or disposable type; they are supplied sterilely packaged as an assembly, used once, and then discarded.

The flow rate control system of this invention is usable with such disposable assemblies with no possible compromise of their sterility, and without itself requiring sterilization between uses, because it does not connect into the flow line or otherwise contact the fluid being fed, but controls its flow rate by variably constricting the flexible tubing 13. For this purpose there is provided a knife edge member 19 which squeezes the tubing 13 against an anvil member 21, the knife edge 19 being spring loaded away from the tubing and driven against it by a cam 23 which is in turn driven by an electric motor 25.

This motor 25 is of AC synchronous type and reversible to drive in one direction or the other depending upon the operation of two switches 27 and 29 through which the motor connects to an AC power supply 31. These switches are so arranged that whenever switch 27 is energized the motor 25 drives in a direction such that cam 23 operates to close or further constrict the tubing 13 and thus reduce fluid flow rate therethrough; whenever switch 29 is energized the motor 25 and cam 23 drive in reverse direction to thus effect an increase in fluid flow rate to the injection needle 15.

For sensing the time of occurrence of each drop as it falls through the drop chamber 17, there is provided a photocell 33 and light source 35 disposed on opposite sides of the drop chamber 17 so that as each drop falls through the chamber it will interrupt transmission of the light beam from the light source to the photocell. A second photocell 37 directly exposed to the light source 35 may be included for compensation purposes as hereinafter explained, with this and the first photocell 33 both providing inputs to a "Level and Drop Sense" circuit 39 as indicated. A third photocell 41 and aligned light source 43 may be provided for sensing the level of liquid which normally stands in the lower end of the drop chamber 17, to detect any lowering of level such as would result from emptying of the flask 11.

The "Level and Drop Sense" unit derives its signal inputs from these three photocells and in response to them generates an output signal which during normal operation of the feed apparatus will comprise a series of discrete pulses each in time coincidence with one drop; in the event of occurrence of a steady stream condition, a drop in level of the fluid in the lower end of the drop chamber, or a light failure, the signal output will change to a pulse train of constant and relatively high repetition rate, and such change provides an indication that one or the other of these flow abnormalities exists. The signal output of this circuit controls operation of the motor 25 through the control circuit next to be described.

The control circuit constitutes a closed loop servosystem which senses any error in timing of each individual drop and energizes one or the other of the motor drive switches 27 and 29 for motor 25 in a manner to accomplish appropriate corrective action. To provide the necessary time reference for drop timing measurement there is included an RC timing signal generator 45 arranged to enable adjustment of its RC time constant as indicated by the "DROP TIME SET" input shown. This generator operates to produce a voltage output of sawtooth waveform, with the voltage rising along the usual RC charging voltage curve until the charging capacitor is reset by an input from the "Drop Reset" circuit, shown at 47, at which time the voltage output drops to zero preparatory to the next charging cycle. Preferably the RC time constants in the timing signal generator 45 are so adjusted that if the drop reset pulse occurs at precisely the called-for moment in time, the voltage output generator 45 will, at the moment in time at which reset occurs, be always at the same value of voltage for all flow rate settings.

In this way the value of voltage output of generator 37, when compared against a fixed voltage reference at the moment of reset, can provide both an indication as to whether the particular drop which triggered the reset was on time or was early or late, and an indication of the magnitude of the time error of the drop. To enable the voltage comparisons needed to derive these indications, the timing signal generator output signal is processed as at 49 to provide two control signals one of which appears as at 51 to provide an indication of the direction of drop timing error; i.e., whether early or late. The other such signal appears as at 53 and provides an indication of the absolute magnitude of the error in drop timing, irrespective of its direction. A third signal also is provided to a "no-drop" triggering circuit 55 the purpose and operation of which will be explained later.

The drop timing error direction circuit 51 controls a flip-flop 57 in a manner such that the flip-flop assumes one or the other of its two possible states depending upon the polarity of the difference between the drop timing signal and a fixed reference voltage of value corresponding to the "on time" value of the drop timing signal. Depending upon the polarity of any difference between these voltages, flip-flop 57 will assume the appropriate one of its two possible conductive states and will transmit, under control of a gate circuit 59, a control signal to one or the other of the motor current supply switches 27 and 29.

The gate circuit 51 operates under control of the drop timing error magnitude signal as supplied to a variable one-shot multivibrator 61. The multivibrator, when triggered by a drop pulse signal supplied from the "Level and Drop Sense" circuit 39, produces an output pulse beginning at a point in time coincident with the beginning of the drop pulse and continuing for a time period of duration proportional to the magnitude of the drop timing error signal.

The multivibrator output connects through lead 63 to the "-Drop Reset" circuit 47 where it provides the necessary drop pulse input to reset the RC timing sweep generator for the next cycle. The multivibrator also connects via a lead 65 to control the gage circuit 59, and through it, also to control the flip-flop 57. Here the control action is such as to disable the flip-flop between multivibrator output pulses and to enable it through the duration of each such pulse. This energizes the drive motor 25 through one or the other of switches 27 and 29, depending upon the state of the flip-flop 57 as determined by the direction of the drop timing error, for a time period equal to the duration proportional to the magnitude of the timing error of the drop which triggered that pulse, the drive motor 25 is energized after each drop pulse for a timer period proportioned to the drop timing error magnitude to thus provide corrective action appropriate to the direction and magnitude of the drop timing error sensed.

For purposes of initiating appropriate remedial action should a steady stream condition become established, and to shut off fluid flow when flask 11 empties or a light fails, the pulse output from the level and drop sensor unit is transmitted also to an "Empty and Steady Stream Detection" circuit 67. This circuit incorporates frequency sensitive means responsive to the relatively high repetition rate pulses which are generated by the level and drop sense circuit 39 when any of these operating irregularities exists, to actuate the motor drive switch 27 thus energizing the motor to drive in closing direction. In the case of the steady stream condition the motor drive will continue until the steady stream breaks it continuity and the resumption of dropwise flow is manifested by a decrease of pulse repetition rate to a value within the range of normal flow rates. In the case of light failure or empty flask condition such decrease in pulse repetition rate does not occur and the motor accordingly continues to drive in closing direction until flow is completely cut off.

It may be noted that at times when the "DROP TIME SET" input is being changed to command an increase in fluid flow rate from an initially very low value to some much higher value, the system would tend to respond only relatively slowly to this command because the drops would at that time be coming only relatively infrequently and corrective action would be taken only at the moment at which each drop occurred. To accelerate system response under these conditions, and also to avoid any possible hang up in system operation due to other causes, the "no-drop" triggering circuit 55 supplies artificially induced drop pulses timed to provide reasonably fast system response to changes in called-for fluid flow rate even when starting from very low fluid flow rates.

Figure 2:
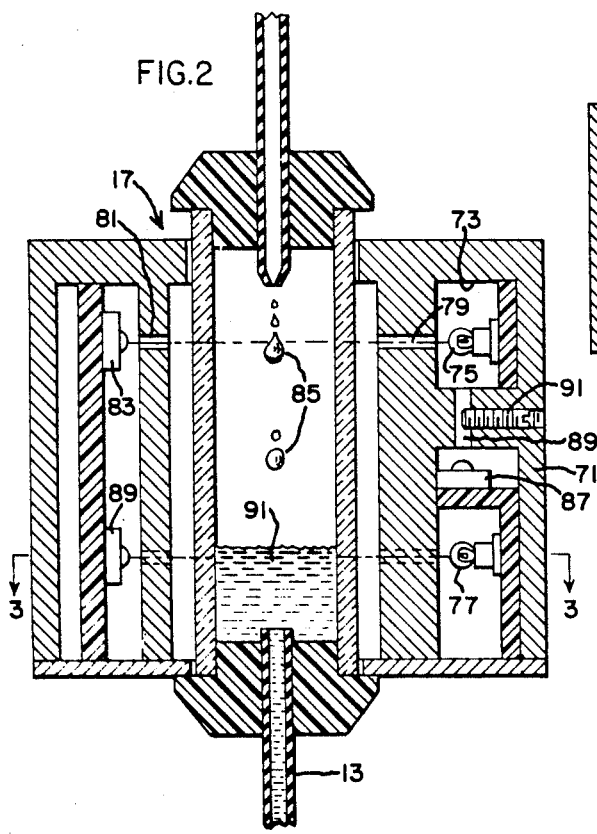
FIG. 2 is a part sectional view of a photoelectric drop sensor suitable for use in the intravenous fluid feeding system of FIG. 1.
Figure 3:
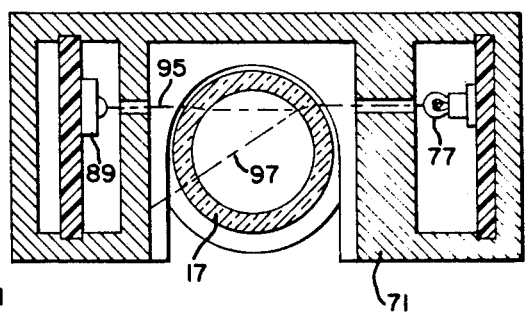
FIG. 3 is a sectional view along the line 3—3 in FIG. 2.

The construction and operation of the "no-drop" and other circuits just described will be more fully understood by reference to the circuit diagrams of FIGS. 4-6, but before referring to those figures it may be helpful to consider certain details of the mechanical arrangement of the photoelectric sensor unit as illustrated in FIGS. 2 and 3. As shown, this unit comprises a housing 71 adapted to be placed on the drop chamber and to be removably affixed thereto by any convenient and suitable means (not shown). Within a first chamber 73 in housing 71 there are mounted two light sources 75 and 77 which as shown are small incandescent light bulbs. The bulb 75 is aligned with a bore 79 formed in housing 71 and with a second bore 81 similarly formed and, through these bores, illuminates a photocell 83 which preferably may be a photoresistive semiconductor of conventional type. The light beam thus formed and detected is so oriented with respect to the drop chamber as to be intercepted by drops such as those illustrated at 85 as they fall through the chamber. The intensity of the light beam incident upon photocell 83 accordingly will be modulated as each drop falls through the beam and the output signal from photocell 83 thus modulated produces the drop pulse signal output as will later be explained.

A second photocell 87 is located adjacent the bulb 72 so as to be illuminated thereby through a connecting bore 89 the effective aperture of which may be adjusted by any suitable means such as the threaded member 93 shown protruding into the bore. Photocell 87 provides a compensating signal which is utilized in the circuit of FIG. 3 as will be explained, to compensate for variations in the level of light output of bulb 75 due to bulb aging, variations in voltage supply and the like.

In normal operation of intravenous feed systems of the kind illustrated there will accumulate and remain in the lower end of the drop chamber a pool of liquid such as indicated at 91. This pool will remain at relatively constant level so long as the flask from which the fluid supply is being derived still contains fluid; when the flask empties and the train of drops ceases the fluid level in the drop chamber will fall and the liquid will drain from the entire flow line unless action is taken quickly to stop all flow through it. To prevent such voiding of the flow line and the problems thereby presented with respect to replenishment of the fluid supply, means are provided for detecting any fall in level of the liquid in the drop chamber, responding thereto to clamp off the feed tubing thus shutting down the system, and indicating to the operator the existence of this empty flask condition.

In accordance with the invention this desired sensing of drop chamber liquid level is accomplished by provision of a third photocell 89 which, together with its associated light source 77, is positioned in the horizontal plane below which any fall in liquid level is to be detected. As best shown in FIG. 3, the bulb 77 and photocell 89 are mounted at points so located in this plane that the line connecting them is substantially displaced from the vertical axis of the drop chamber when in the normal position illustrated.

With this arrangement, and assuming first the absence of liquid at the level of the light beam, the beam will be deflected slightly by refraction upon its passage through the opposite walls of the drop chamber. The direction of the deflections will be complementary and their magnitudes small, however, so under these conditions the beam will follow the path indicated by broken line 95 and directly illuminate the photocell 89. Assuming next the presence of liquid in the drop chamber above the level of the light beam and assuming the liquid to be an optically transparent one such as distilled water, the beam will be deflected by refraction upon entering the liquid column, due to the higher index of refraction of the liquid, and will follow the path indicated by broken line 97 thus missing the photocell completely.

Finally, again assuming a level of liquid above the beam but now assuming a relatively opaque liquid such as blood, it will be seen that the response of photocell 89 will be essentially the same as in the case of the transparent liquid. The beam will not illuminate the cell either because the light will be wholly absorbed in the liquid, if it is sufficiently opaque, or, if not, the light will be refracted by the liquid to follow along the line 97 in generally the same fashion as with a transparent liquid. In this way the photocell 89 is made to be illuminated by the light beam whenever the column of liquid falls below the level of the beam, but the photocell will remain unilluminated and will output its dark resistance whenever the beam is intercepted by the column of liquid whatever may be the degree of transparency or opacity of the particular liquid in the column.

In accordance with the invention, the respective signal outputs of the three photocells 83, 87 and 89 are combined in a "Level and Drop Sense" circuit as shown in FIG. 4, to which reference is now made. The drop sensing photocell 83 and compensating photocell 87 conveniently may be identical solid state photoresistors and are connected in series circuit relation so as to divide the DC voltage on power supply terminal 101 approximately equally between them. A resistor 103 included in series with the photocells forms, with diode 107, a fail-safe circuit which operates to detect any light failure and to shut down the system upon occurrence thereof in a manner to be explained. A capacitor 109 connected between the photocell signal output terminal 105 and ground bypasses the compensating photocell 87 and resistor 103, for purposes of immunity to AC ripple and transients.

The drop signal output taken at terminal 105 is coupled through a capacitor 111 and diode 113 to the base electrode of a transistor 115. This transistor derives its base current drive through a resistor 117, has its collector electrode connected through resistors 119 and 121 to the supply voltage, and has its emitter electrode connected to ground through a resistor 123 which, with two additional series connected resistances 125 and 127, constitutes a voltage divider.

The relative values of the resistances 119, 121 and 123 in the collector-emitter circuit of transistor 115 are selected so as to achieve a desired voltage level, say 10 volts in the particular example being described, at the terminal 129 between resistors 119 and 121. Terminal 129 connects through a capacitance 131 to ground, and connects also to the anode of a programmable unijunction (PUJ) transistor 133 the cathode of which connects through a resistor 135 to ground. The voltage divider constituted by resistors 123, 125 and 127, together with resistors 137 and 139 and the level sense photocell 89 to which the voltage divider connects through a diode 141, establish on terminal 142 a reference voltage which in the exemplary embodiment being described is about 12 volts. Such reference voltage is applied to the gate electrode of PUJ transistor 133 through a resistor 143, a bypass capacitor 145 connected as shown being provided for minimizing the effects of transients which otherwise might affect this reference voltage.

The drop signal output from the circuit of FIG. 4 is taken from a terminal 146 in the PUJ cathode circuit, and a second connection to this terminal 146 provides a feedback signal which connects through a diode 147 and resistor 148 to the input or base electrode of transistor 115. This feedback signal, which is in the form of a positive-going pulse, provides a latching function which serves to disable the circuit for a predetermined time period after response to each primary drop, so as to assure that it does not respond to secondary drops trailing immediately behind the primary drop. The time period through which such latching continues is determined by the RC time constant of resistance 148 and a capacitor 149 in series therewith, this time constant being made substantially shorter than the minimum spacing between drop pulses occurring at highest selectable fluid flow rate. For example, with a maximum flow rate value of 1,000 cc. per hour, the time between drops would be approximately 330 milliseconds and the time constant of resistance 148 and capacitance 149 would be selected to be several times shorter than this, perhaps 70 milliseconds. In this way the system can be made completely insensitive to secondary drops which trail along behind the primary drop with a time spacing of less than 70 milliseconds as is usually characteristic of secondary drops, and insensitive also to any transients due to scintillation or the like by a drop as it falls past the photocell.

In operation of the circuit of FIG. 4, with fluid level in the drop chamber standing at or above the normal operating level so that photocell 89 is shadowed thereby and accordingly is in its high-resistance state, and with photocell 83 in its low-resistance state because not presently shadowed by a drop, the voltages at terminals 105, 129 and 142 will be at their steady state values previously specified. When a drop falls through the chamber and momentarily shadows the photocell 83, the resistance of that cell will increase and the resultant negative-going pulse at terminal 105 will be coupled through capacitor 111 to the base of transistor 115, removing its base current drive and causing the transistor to become nonconducting. The voltage at terminal 129 then will rise from its normal quiescent level of approximately 10 volts exponentially toward the DC supply voltage, which in this example may be approximately 20 volts. The time constant for this exponential change in voltage level at terminal 129 is determined by the RC time constant of resistor 121 and capacitance 131, and the change will continue so long as the drop shadow remains on photocell 83 and transistor 115 remains nonconducting, or until the terminal value of voltage is reached. When the voltage on terminal 129 and on the PUJ anode connected thereto exceeds the value of voltage applied to the PUJ gate by the reference voltage source coupled through terminal 142, the PUJ will regenerate and capacitor 131 then will discharge through the PUJ load resistor 135, producing a positive-going waveform on terminal 146 which constitutes the "Drop" signal output.

The time constant defined by resistance 121 and capacitance 131 is such that the voltage on terminal 129 will not return to the level where it could again fire the PUJ until some time after the transistor 115 has again become conducting, because the shadow of the drop is no longer incident upon the photocell 83 and the cell accordingly has returned to its normal relatively low resistance value. Such reversion by photocell 83 to its low resistance state is operative to return the transistor 115 to conduction, thus dropping the voltage at terminal 129 back to a level such that the PUJ 133 will not again fire even after capacitor 131 has recharged back to the level of voltage which then will be present on terminal 129. The PUJ 133 accordingly will fire only once for each drop that intercepts the light beam incident upon photocell 83.

However, in the event a steady stream becomes established within the drop chamber the shadow thrown thereby across photocell 83 will continue for so long as the steady stream remains unbroken and during this interval the voltage on terminal 105 will remain low. Under these conditions transistor 115 will remain nonconducting through a time period of duration determined by the time constant defined by resistance 117 and capacitance 111, the values of which are selected to make this time constant sufficiently long to provide adequate time for the flow control device to move either full closed or far enough in closing direction to assure that the drops will again be formed. Typically this requires an RC time constant of the order of 10 to 15 seconds.

During this period, the PUJ 133 will be free running and will fire at a repetition rate determined by the time constant of resistance 121 and capacitance 131, the values of which are selected to yield a time constant which is substantially shorter, preferably several times shorter, than the time between drops corresponding to the highest selectable fluid flow rate. Assuming the highest available fluid flow rate to be 1,000 cc. per hour which corresponds to a time between drops of approximately 330 milliseconds, an RC time constant such that the PUJ 133 would fire at intervals of approximately 100 milliseconds duration would be appropriate. The pulse output on terminal 146 then would be approximately 10 pulses per second for this steady stream condition, as contrasted to about 3 pulses per second for the drop pulse output corresponding to the highest selectable fluid flow rate, and this very substantial difference in pulse repetition rate enables the control to distinguish between these two conditions and to take corrective action upon occurrence of the steady stream.

The reference voltage network which provides the unijunction gate electrode reference voltage on terminal 142 includes, as previously noted, the level-sensing photocell 89. When the fluid level in the lower end of the drop chamber is at a normal height indicating that the flask is not yet empty, photocell 89 will not be illuminated and accordingly will be a relatively high resistance value. When the flask empties and the fluid level in drop chamber 17 falls below this normal level, the resultant increase in intensity of illumination level on photocell 89 will cause its resistance to decrease, with consequent drop in voltage at terminal 142 and on the PUJ gate electrode connected thereto. This will trigger the unijunction into its free running mode and thus produce positive output pulses on terminal 146 at the same high repetition rate, approximately 10 pulses per second in this example, as resulted from the steady stream condition.

For purposes of enhancing the reliability of the system, the diode 107 serves to drive the system in a direction to shut off fluid flow in the even of failure of either or both of the two light sources (35 and 43 in FIG. 1) included in the drop sensor unit. These lights preferably are series wired so that if one fails the other will also be extinguished, and when this occurs the resistance of each of the three photocells will increase markedly. The current flow through photocells 83 and 87, and through resistor 103 in series therewith, then will sharply decrease, which causes diode 107 to become forwardly biased and to bypass through the resistor 103 the base current drive for transistor 115. As a result the transistor switches off the PUJ 133 accordingly goes into the same free running mode as in the case of the steady stream and empty bottle conditions, thus producing output pulses on terminal 146 at high repetition rate.

In this way, any irregularity of fluid flow or control, including the steady stream condition, empty flask condition and light failure, will be manifested as a change in the pulse output on terminal 146 from the normal one-pulse-per-drop signal for which the maximum pulse repetition rate is approximately 3 pulses per second, to a constant and relatively higher pulse repetition rate of approximately 10 pulses per second. This difference in pulse repetition rate enables detection of the flow abnormality and its correction through the means to be described.

The drop pulses generated by the drop sensor circuit of FIG. 4 are transmitted to the control circuit of FIG. 5, which compares the time of occurrence of each drop against a reference to thus derive a measure of drop timing error, and which takes corrective action in the event such error exceeds some predetermined minimum value. The drop time reference is provided by an RC timing signal generator circuit, designated generally by reference numeral 151, comprising resistance means 153 and capacitance means 155 connected in series relation with each other and also with a DC voltage supply designated generally by reference numeral 157 and with ground through a reset circuit designated generally by reference numeral 159.

Power supply 157 comprises an AC transformer 161, a half-wave rectifier 163 and a filter capacitor 165 which together provide a DC voltage of suitable value, say 20 volts, at the point 167 at which the voltage supply to the RC timing signal generator 151 is taken. The construction and operation of the reset circuit 159 will be described later; suffice it to note here that during the charge cycle this circuit operates to connect the lower or negative side of capacitor 155 to ground, during the reset cycle it operates to connect the upper or positive side of the capacitor to ground, and it is triggered to cause such reset each time a drop pulse from the drop sensor is received at terminal 169 and translated to a "reset" pulse which is transmitted on lead 171 to the reset circuit 159.

The RC timing signal generator 151 and reset circuit 159 work together to produce on lead 173 an output sawtooth waveform the amplitude of the peaks of which vary directly with the time duration of the charging period before which reset occurs, and inversely with the resistance value of the resistor means 153. Due to this inverse relationship, it is possible by proper selection of the values of resistance 153 to produce a charging rate such that the amplitude of the voltage output on lead 173 always will be of the same predetermined value at the moment of rest, if the reset pulse and the drop which triggers it are precisely on time.

The necessary adjustment of the time constant of this RC timing signal generator is afforded by a pair of decade switches 175 and 177 which respectively operate to switch into parallel connected relation selected resistors of a "hundreds" resistance bank 179 and of a "tens" resistance bank 181. These resistance banks and the decade switches which control then provide a resistance value properly related to the value of capacitance 155 to command a fluid flow rate, in cubic centimeters per hour, corresponding to the numbers indicated adjacent the "hundreds" and "tens" resistance banks, respectively. The basis for selection of appropriate resistance values for use in these "hundreds" and "tens" decades is fully explained in the aforementioned patent application of Hildebrandt et al.

The waveform on lead 173 is a sawtooth having each peak of the same fixed magnitude, say 9 volts in the particular embodiment being described, so long as each successive drop occurs precisely on time. If a drop is early, the sawtooth will peak at lower value due to the shorter period of charging current flow to capacitor 155 before reset is triggered by the premature pulse; if a drop is late the sawtooth will peak at higher value due to the longer charging time afforded by the delayed drop pulse. The drop timing error measure thus constituted is transmitted to the base of a transistor 183 connected in emitter follower configuration and back biased by resistors 185 and 186 to some fixed voltage, say 7 volts. When the signal applied on lead 173 exceeds this 7 volts, the emitter of transistor 183 then follows the input voltage minus the transistor's base-emitter voltage drop, and transmits the signal thus modified to the base of another transistor 187. This transistor provides a first emitter follower output on lead 189 to a flip-flop designated generally by reference numeral 191, where it controls the direction of drive motor operation in a manner to be explained. A second such output is provided on lead 193 to a "no-drop" triggering circuit 195 also to be explained.

The drop timing error magnitude signal generated at the collector of transistor 187 is transmitted by a lead 197 to a variable one-shot multivibrator and gating circuit designated generally for reference numeral 199. This circuit operates to generate an error magnitude signal pulse which is triggered by the reception of each drop pulse at terminal 169 and is of duration proportional to the absolute magnitude of the drop timing error signal as supplied on lead 197. The variable duration output pulse on lead 200 from multivibrator circuit 199 constitutes a gating pulse to the flip-flop 191 which is operative to "enable" the flip-flop through the duration of each such pulse and to "disable" the flip-flop at other times.

Flip-flop 191 comprises a pair of transistors 201 and 203 having their respective bases and collectors cross-coupled through resistors 205 and 207 in conventional fashion. The flip-flop thus constituted switches from a first state, in which transistor 201 is conducting and transistor 203 not, to a second state in which the reverse relationship holds, depending upon the relative magnitudes of the signals applied to the transistor bases. One such signal is the drop timing error direction signal on lead 189, which is coupled through the diode 209 to the base of transistor 201. The reference voltage against which this drop timing error signal voltage is compared is supplied through a diode 211 from a reference source of fixed value just equal to the peak value of the drop timing error signal voltage when the drops are precisely on time. The reference voltage may as shown be conveniently derived from a voltage divider constituted by resistors 213, 214 and 215 connected in series relation between the positive voltage supply and ground.

Depending upon whether the peaks of the drop timing error signal exceed or are exceeded by this reference voltage, one or the other of transistors 201, or transistor 203 may become conducting. Neither can become so, however, unless the lead 200 to which the transistor emitters have a common connection provides a path to ground. The grounding of this lead 200 is controlled by the variable one-shot multivibrator and gating circuit 199 in response to the drop timing error magnitude signal, the operation being such that lead 200 is effectively grounded by the multivibrator each time a drop pulse is received and is held at ground for a time period of duration proportional to the magnitude of the timing error of that drop. The flip-flop 191 thus is gated on and off by the variable one-shot multivibrator 199 when gated on operates to connect, to the path to ground thus afforded, the collector of whichever of the two transistors 201 and 203 has the more positive signal on its base at the moment the flip-flop is gated on.

The output of the flip-flop 191 is by way of leads 217 and 219 connecting respectively to an "open" switch 221 and a "-close" switch 223, the two switches being of identical construction as shown. Each such switch comprises a transistor 225 connected in common emitter configuration and connected for base signal input from the flip-flop 191, with each transistor being bypassed by a diode 227 which completes the motor drive current loop during one-half of each cycle of the AC supply voltage. This motor drive circuit further includes a capacitor 229 in series with each of the switches 221 and 223, and one of the opposed windings 231 and 233 of the motor 235. A lead 237 from the common connection of these motor windings connects to a center tap of the power transformer 161. The motor drive circuit then is completed through the filter capacitor 165, which acts effectively as a short permitting free flow of the AC motor drive current, and through a lead 239 to each of the switches 221 and 223. The necessary 90° phase shift for supply of quadrature current to the opposed motor winding 231 may be supplied by a single nonpolarized capacitor connected across the windings or, as shown, by a pair of electrolytics 241 having their point of common connection maintained always at voltage positive with respect to the motor windings by connection through a biasing resistor 243 to the DC voltage supply line.

In operation of the motor drive circuit as thus far explained, the gating on of flip-flop 191 by the grounding of lead 200 through the multivibrator and gating circuit 199 on occurrence of a drop pulse, will cause one or the other of the switches 221 and 223 to become conducting, depending upon the magnitude of the drop timing error direction signal supplied on lead 189 as compared against the reference voltage supplied to the flip-flop from the voltage dividers 213–215. In this way the drive motor 235 is energized to drive in a direction dependent upon the drop timing error direction signal as supplied to the flip-flop 191, and to drive for a time period dependent upon the length of the gating pulse supplied from the variable one-shot multivibrator 199. It might be noted here that since motor 235 is of synchronous type, it will not produce any net motion of the motor output drive shaft in response to an AC drive pulse of time duration less than some predetermined minimum, the width of this inherent deadband being dependent upon the motor design and also dependent upon the point during the AC supply voltage cycle at which the pulse begins and ends.

With reference again to the multivibrator and gating circuit 199, this comprises a timing capacitor 245 and resistance element 247 connected in series relation, these preferably being of values such that the RC time constant they define is relatively small so that capacitor 245 follows very closely the voltage appearing on the lead 197 to which it connects through the resistor 247. Capacitor 245 also connects via a lead 249 to the base electrode of a transistor 251 having a grounded emitter and forward biased so as to operate with a collector voltage of perhaps 1 volt in the absence of signal input on lead 249. This transistor will respond to negative-going signals applied to its base by lead 249 to switch off and thus cause its collector to go more positive.

Also connecting to lead 249 are a resistor 253 which serves to control the duration of each multivibrator output pulse by controlling the rate of discharge of timing capacitor 245 in a manner to be explained, a capacitor 255 which lowers the input impedance of transistor 251, a diode 257 through which any input from the "no-drop" circuit 195 is coupled, and a makeup current source comprising resistors 261 and 267 and two diodes 263 and 265 which are poled as shown and one of which (265) is of zener type. This current source is controlled by a transistor 259 in accordance with a base signal input through a voltage divider network 269–271 connecting to the collector of transistor 251.

As previously indicated, the drive motor is switched on in response to each drop pulse and remains on for a period proportioned to the absolute magnitude of the drop timing error. As has also been explained, transistor 187 impresses on lead 197 a voltage of absolute magnitude which differs from a preselected reference value by an amount proportioned to the drop timing error. To enable measurement of this difference voltage, a transistor 273 is provided with its collector connected by lead 257 between the resistor 247 and capacitor 245, and its emitter connected by lead 277 to the reference voltage which in this example is constituted by the voltage divider resistors 213–215, at the connection between resistors 213 and 214. This voltage comparison must be made at precisely the same moment in time at which the drop occurs, and to provide such necessary synchronization the base of transistor 273 is connected through a resistor 279 on the collector of transistor 251, so that the voltage comparison may be initiated in response to the "Drop" signal input at terminal 169.

Summarizing operation as thus far described, if the drop in question precisely on time, the drop timing error magnitude signal on lead 197 when compared against the fixed reference voltage on lead 277 will result in the application of a more positive voltage to the base of transistor 251, restoring that transistor to conducting state immediately after the drop pulse is received, so that the multivibrator output pulse is of duration approximately equal to the width of the drop pulse and accordingly is of the order of 2 milliseconds or so. The motor 235 accordingly does not respond. If the drop is either quite early or quite late, the drop timing error voltage on lead 277, and as a result the voltage on lead 249 will be driven negative and will remain negative through a time period dependent upon the time constant of the RC circuit comprising capacitance 245 and resistance 253. The multivibrator output pulse will continue through this period and the motor will run through this same period less its deadband, the motor operating in a direction determined by the state of the flip-flop 191 at the moment at which the flip-flop 191 is gated on by the multivibrator.

There remains for consideration the case in which there is some drop timing error but the error is sufficiently small as to fall within the system deadband. Since as previously mentioned the motor deadband may be as wide as 10 milliseconds, the multivibrator output must be of this time duration in order to assure that the motor will respond to it. The duration of the multivibrator output is determined primarily by two factors, these being the RC time constant of the circuit including capacitor 245 and the resistor 253, and the level of charge on the capacitor 245 at the moment after comparison of the drop timing error magnitude signal voltage on lead 197 against the reference voltage on lead 277. These factors are in turn dependent upon other design parameters such as the slope of the curve of timing error signal magnitude in volts against drop timing error in seconds, as more fully explained in the aforementioned patent application of Hildebrandt et al.

The multivibrator 199 also transmits an output pulse via lead 171 to the reset circuit 159, where the pulse is applied to the base of a switching transistor 287 operative when switched on by the leading edges of such pulses to short the hot side of capacitor 155 to ground and thus discharge it preparatory to another RC timing signal cycle. The discharge circuit includes, however, a diode 289 connected so that upon reset the voltage on the lower or cold side of capacitor 155 becomes negative by a value voltage dependent upon diode voltage drop, this typically being of the order of 0.6 volts. The negative voltage thus generated is applied to the base of a transistor 291 which normally is forward biased so as to permit the charging current flow for capacitor 155 through its base emitter diode connection to ground. The reverse bias placed on transistor 291 by this negative voltage switches the transistor 291 off and thus prevents flow of charging current so long as negative voltage remains at the transistor base.

This voltage can discharge only through resistor 293, so the period during which the transistor 291 remains switched off is dependent upon the time constant of the RC circuit comprising capacitor 155 and resistor 293, and of course the value of the supply voltage to which resistor 293 connects. The RC circuit components are selected to provide a time constant such that the transistors 291 remains reversed biased by the charge stored on capacitor 155 for a time period of several milliseconds, perhaps 6 milliseconds in a system having the performance characteristics previously mentioned. During this period, transistor 291 provides an output signal via lead 295 which is additive to the multivibrator output signal on lead 171 and which, like it, is applied to the base of transistor 287.

This signal is operative to hold transistor 287 in conducting state, to thus hold the lead 173 to capacitor 155 at ground through the delay period defined by the RC elements 155 and 293.

Since the output pulse on lead 295 is of fixed time duration, about 6 milliseconds in the particular example being described, transistor 287 always will remain conducting, when triggered by the pulse on lead 171 from the multivibrator, for a time period of at least this duration. Then, depending upon whether the pulse on lead 171 has yet terminated, the transistor 287 will either immediately become nonconducting or will continue on conduction state until termination of the multivibrator output pulse on lead 171. Capacitor 155 accordingly cannot begin to again charge and to start a new RC timing signal cycle until the termination of the last-to-end of these two control pulses, thus assuring that the RC circuit does not again begin to charge until after the multivibrator 199 and the motor drive circuits controlled thereby have completed their respective cycles of operation.

Referring now to the "no-drop" circuit 195 previously mentioned, this circuit operates to generate a simulated drop pulse whenever the drops themselves are delayed by amounts sufficient to generate a drop timing error magnitude signal of predetermined voltage level. To this end, the "no-drop" circuit comprises a pair of transistors 297 and 299, the transistor 297 being back biased by a base connection to the same fixed reference voltage source (voltage divider 213–215) which provides the voltage reference for the drop timing error direction and drop timing error magnitude comparisons. When transistor 297 becomes forward biased, due to the drop timing error voltage rising to such high level as to indicate an excessive drop delay, transistor 297 drives the base of transistor 299 positive, causing its collector to go negative and to produce at the drop pulse input terminal 169 a negative-going pulse effective to trigger the multivibrator 199 and to initiate a control cycle in the same manner as would a true drop pulse from the drop sensor.

To enable insertion of the intravenous feed tubing 13 (FIG. 1) into operative engagement with the cam follower 19 and anvil 21, it is helpful to fully retract the cam follower by energizing the motor 25 to drive the cam 23 to one extreme of its motion. To this end, the circuit of FIG. 5 incorporates a load position "LD" in the decade switch 153, connected when the switch is set to this position to couple the supply voltage at terminal 167 through a resistance 310 and diode 303 to the lead 198 which it will be recalled applies the motor drive direction control signal to flip-flop 191. The result of application of the supply voltage to this flip-flop is to assure that it switches to or remains in a state such that the motor drive signal is in opening direction.

This same "LD" signal is applied through a resistance 305 to the base of transistor 259, switching that resistor on and providing a ground connection therethrough for the lead 200 from flip-flop 191, thus enabling a drive signal output therefrom to the "open" switch 221. This will drive the feed control cam to the full open position where it will remain so long as the switch 175 is held at its "LD" setting.

The signal generated by switch 175 when at its "LD" setting also is coupled through an isolating resistor and diode 307 to the "Empty and Steady Stream Detection" circuit of FIG. 6, to which reference is now made. The load signal constitutes one input to the base electrode of a transistor 311 having as a second base electrode input, through resistor 113, the pulse output of the "Level and Drop Sense" circuit of FIG. 4. Any load signal input to the base of transistor 311 will effectively clamp the transistor on, since the load signal is approximately equal to the full supply voltage, and this will render the circuit of FIG. 6 insensitive to any "drop" signal input whenever there exists a load signal. The purpose of this is to prevent any interference by the "close" command which is generated by the circuit of FIG. 6 with an "open" command generated by movement of switch 175 (FIG. 5) to its "LD" setting.

In the absence of such load signal, however, a "Drop" signal input to transistor 311 will cause the transistor to become conducting for the duration of the input pulse, which with circuit parameters as shown in FIG. 6 would typically be about 50 microseconds. This is sufficient time to enable discharge of a capacitor 315 connected to the transistor collector electrode and through a diode 317 to ground. When the input pulse terminates, capacitor 315 commences to recharge through a resistor 319, diode 321 and capacitor 323 connected as shown. This latter capacitor 323 is much larger—perhaps 10 times larger—than the capacitor 315, and so experiences an incremental voltage increase with each input pulse resulting from the charging current for the smaller capacitor 315. Capacitor 323 is in parallel with two resistors 325 and 327 which, together with it, define an RC time constant such that at the highest pulse rate input which is characteristic of normal operation, i.e., the approximate 3 pulses per second which would correspond to a maximum flow rate of about 1,000 cc. per hour, capacitor 323 will charge to and hold at approximately 1.5 volts. This voltage, divided by resistors 325 and 327, applies to the base electrode of a transistor 329 a bias voltage of value such that the transistor 329 under these conditions is nonconducting.

However, if the input pulse rate should rise to the approximate 10-pulse-per-second level which is indicative of light failure, a solid stream condition employ flask condition, the correspondingly higher repetition rate of the incremental charges added to the capacitor 323 will yield a proportionately higher voltage across the divider network 325, 327, raising the voltage on the base electrode of transistor 329 to a level such the transistor will conduct. The resulting increase in current flow through the transistor 329 is effective to energize a warning light 331 in the transistor collector circuit, to call operator attention to the existence of the flow irregularity which triggered the signal. This current flow also generates a negative-going pulse on lead 333 which is inputted to the "-close" switch 223 in the control circuit of FIG. 5, and there serves to energize the output motor to drive in a direction to cut off the fluid flow by clamping down on the feed tubing. In this way the system responds in the same way to light failure, a steady stream or an empty flask condition, to illuminate a warning light and at the same time to shut down the system until the operator arrives to replace the flask or take other remedial action.

If the operational irregularity which initiated this action was a steady stream condition, the system normally can itself correct this problem because as the motor drives in closing direction the pinching of the feed tubing quickly will reduce the fluid flow to a lever such that drop formation will again occur. At this point the pulse output from the drop level signal generator will drop from the approximately 10-pulse-per-second rate indicative of the steady stream condition to a pulse rate corresponding to the drop flow thus established. When this occurs the capacitor 323 will discharge through resistors 325 and 327 with a delay of approximately 1 second in this example, and the regular mode of operation will then be reestablished.

Sometimes other operational irregularities can produce photocell output signals not readily distinguishable from those which are characteristic of the steady stream condition. For example, if fluid should spatter up from the drop chamber pool and adhere to the chamber walls in the path of the light beam therethrough, the drop sensor output will change in much the same manner as in response to a steady stream, and there will result a "close" command to drive the system toward shutdown in the same way as in the case of the steady stream.

Upon conclusion of the 10–15 second timer period determined by the RC circuit 111, 117 (FIG. 4), transistor 115 will again become conducting thus terminating the "close" command and enabling response to the next drop input. The "no-drop" circuit (FIG. 5) now will be outputting "no-drop" pulses and the system will respond to each such pulse to take one step back in opening direction. After the required number of "no-drop" pulses necessary to sufficiently open the flow line to enable commencement of drops again, normal control will be reestablished.

Figure 7:
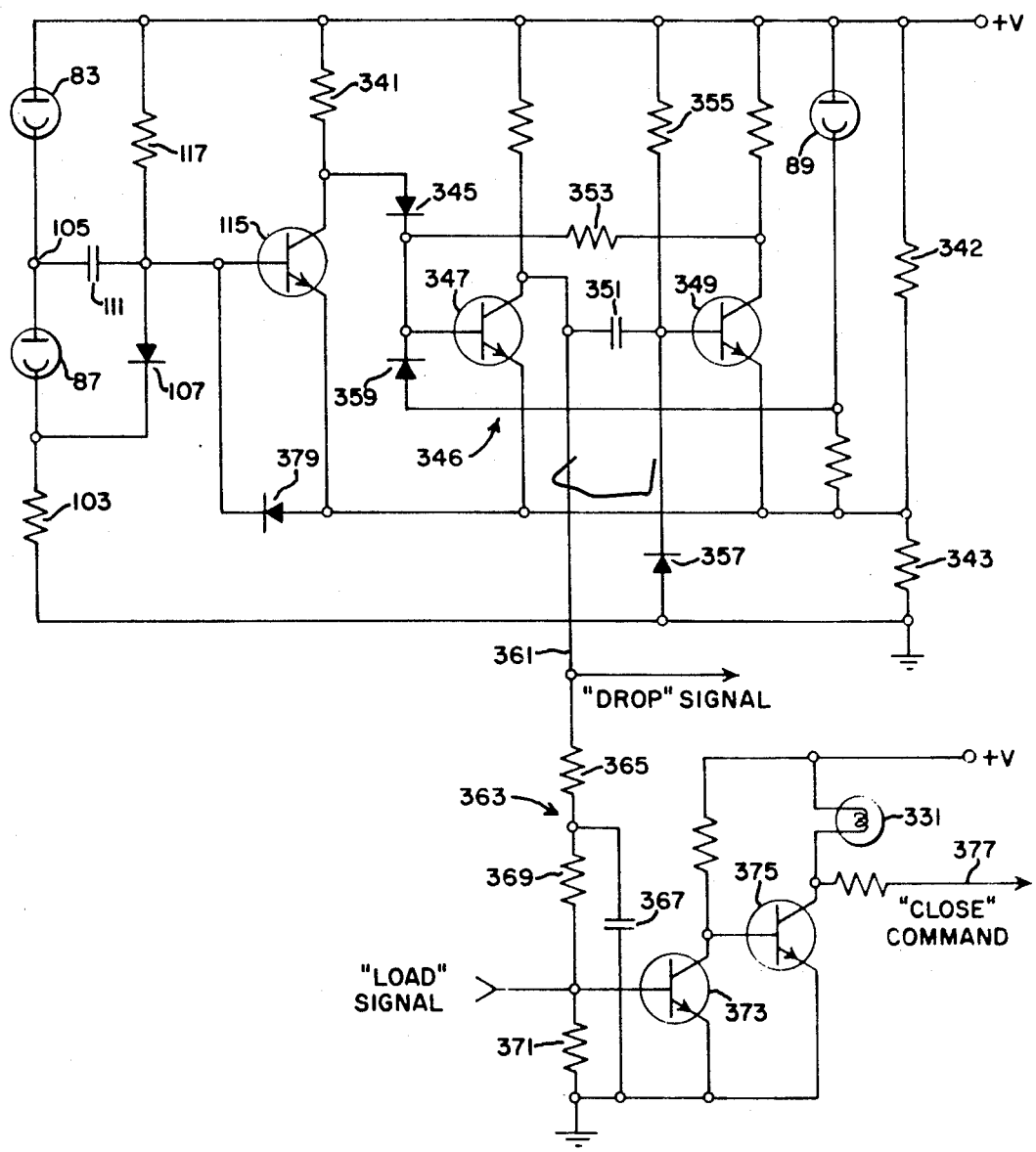
FIG. 7 is a schematic circuit diagram of an alternative embodiment of drop and level sensor for use in the intravenous flow control of FIG. 1.

FIG. 7 illustrates an alternative embodiment of the invention, combining the drop and level sensing function of FIG. 4 and discrimination function of FIG. 6. In FIG. 7, the sensing photocell 83 and compensating photocell 87 are series connected as before and the photocell signal output is again coupled through a capacitor 111 to the base electrode of transistor 115, which is biased into conduction by resistors 117 and 341 and a voltage divider comprising resistors 342 and 343. When photocell 83 is momentarily shadowed as by passage of a drop there results a negative-going swing in voltage at its connection 105 with the reference photocell 87; this switches transistor 115 off thereby producing a positive-going voltage on the transistor collector electrode which constitutes a trigger signal coupled through diode 345 into a monostable multivibrator designated generally by reference numeral 346.

Multivibrator 346 comprises a first transistor 347 which is normally off and a second transistor 349 which is normally on. Transistor 347 begins conduction when the collector voltage of transistor 115 rises to exceed the forward drop of diode 345 and the base-emitter junction voltage of transistor 347. The collector voltage then goes negative thus coupling a negative-going signal through capacitor 351 to the base electrode of transistor 349, switching it off. The resultant signal output on the collector electrode of this transistor is coupled by resistor 353 back to the base electrode of transistor 347.

The positive feedback provided in this way sill hold transistor 347 conducting for a period of time determined by capacitor 351 and a resistor 355 the values of which are selected to provide an RC time constant of perhaps 100 milliseconds in this example. After the time delay thus determined, transistor 349 will again switch on and terminate the positive feedback signal coupled through resistor 353 to the base electrode of transistor 347. If the drop signal input through diode 345 is no longer present after this 100millisecond time period and the voltage on the collector of transistor 115 is again low, transistor 347 will revert to and remain in its off state. Thus, the response of multivibrator 346 to the voltage fluctuation on the photocell terminal 105 which results from passage of each normal drop is an output pulse on line 361 of standardized width, equal to approximately 100 milliseconds in this example.

A diode 357 connected to the base electrode of transistor 349 as shown provides improved standardization of pulse width, by assuring that capacitor 351 charges always to the same voltage level irrespective of the magnitude of voltage swing on the collector electrode of transistor 347. Through the duration of this 100-millisecond pulse period through which the multivibrator remains in its switched state, the system is disabled against response to fluctuations in voltage at the photocell output terminal 105 attributable to any cause such as secondary drops falling through the light beam. This affords the desired immunity to response to secondary drops.

It will be noted that in the embodiment of FIG. 7, unlike that of FIG. 4, voltage fluctuations at the photocell output terminal may to some extent affect the duration of the drop pulse period, because perturbations in the input to the multivibrator 346 in FIG. 7 will affect the level of charge on timing capacitor 351. This does not adversely affect accuracy of drop measurement or control, however, because in both described embodiments of the invention control action is responsive solely to the pulse leading edge; control is not responsive to pulse duration nor in any other way dependent on timing of the pulse trailing edge. Therefore the fact that pulses may in this case not be absolutely uniform in duration is immaterial; all that is required is that their minimum duration exceed the secondary drop period of 100 milliseconds or so and that their maximum duration not exceed the 330 or so milliseconds corresponding to drop spacing for maximum desired flow, and these limits may be easily kept within.

For empty detection, the illumination of the level sensing photocell 89 which results from any fall in level of the fluid column in the drop chamber below normal, will produce a positive polarity signal which is coupled through diode 359 to the base electrode of transistor 347. It will be noted that this, unlike the normal drop signal input through diode 345, is a DC signal and will continue until the fluid column is restored to normal height as by replacement of the empty flask. Before discussing the utilization made of this empty flask signal another source of a similar DC input will be described.

Any failure of the light source which illuminates photocells 83 and 87 will cause the resistance of the cells to increase markedly, resulting in a drop voltage at the connection between cell 87 and resistor 103. Diode 107 then removes the base current drive from transistor 115, causing it to switch to and remain in nonconducting state. Its collector electrode goes positive, producing a DC input through diode 345 to the base electrode of transistor 347. Through this means, failure of the drop sensor light source produces a signal input to the multivibrator 346 similar to that generated in response to the empty flask condition.

Either such signal input will be effective to switch transistor 347 off and to hold it off so long as the signal continues, thus impressing a positive voltage on the "drop" signal lead 361. This lead connects also to a discriminator circuit designated generally by reference numeral 363, which includes an RC integrating filter 365, 367 effective to pass any DC signal appearing on lead 361 but not the normal drop pulse signals. The discriminator circuit further comprises a voltage divider 369, 371 and staged transistors 373 and 375 responsive to any signal input through the filter to output a "close" command on line 377 which connects to the control circuit of FIG. 5 as in the embodiment first described. The resistance and capacitance elements in filter 365, 367, are of values such that DC signals as produced in response to light failure or empty bottle condition are passed whereas pulsed signals at repetition rates corresponding to normal drop rates are not passed. Preferably the filter is designed to pass also drop pulses, whenever their repetition rate very substantially exceeds that corresponding to the highest settable flow rate. This is done because necessary corrective action can be accomplished more quickly in response to a "close" command than in the normal control mode; in the latter mode the motor steps in closing direction while a "close" command compels it to run continuously.

Again assuming the highest available flow rate to be 1,000 cc. per hour and the maximum normal drop pulse repetition rate to be roughly 3 pulses per second, the resistance and capacitance elements of filter 365, 367 might desirably be of values such that no signal is passed in response to the standardized width pulses inputted from multivibrator 346 where those pulses occur at a repetition rate less than 10 pulses/second, but signal is passed at higher repetition rates. The discriminator circuit then will be operative to output a "close" command in response either to a DC signal input or to a high repetition rate pulse input, but not in response to pulse inputs at repetition rates corresponding to normal fluid flow rates.

While the creation of steady stream also is a steady state condition yielding a DC output signal in the form of a change in DC voltage level on terminal 105 connecting photocells 83 and 87, such DC signal is for several reasons not treated in the same way as the empty flask and light failure signals. The principal reason for this is that changes in DC voltage level at terminal 105 may result from causes other than a steady stream, as for example from fluid spattering against the drop chamber walls as previously explained.

To control response to changes in light level due to these and other such causes while at the same time enabling correction for the steady stream condition, transistor 115 is made responsive to a steady stream input as manifested by a change in DC voltage on terminal 105, to switch on and then to remain on only for a limited time period the maximum duration of which is determined by the RC time constant of resistor 117 and capacitor 111. This maximum "on" period is standardized to be independent of the magnitude of the voltage swing on terminal 105 by a diode 379 connecting the base electrode of transistor 115 to its emitter electrode as shown and through its duration transistor 115 remains on to provide a DC signal output to the discriminatory circuit 363. This circuit then outputs a "close" command which continues through the period transistor 115 remains on.

In operation, if an input pulse is attributable to an ordinary drop, the positive-going voltage which will immediately remove the charge from capacitor 111 and thus remove the clamp imposed by diode 397, returning the transistor 115 to its nonconducting state and readying the circuit for normal response to the next drop input. If, however, the input is not attributable to a drop but rather to the initiation of a steady stream condition, there will be no negative-going voltage on terminal 105 following the initial positive-going swing, and capacitor 111 accordingly will remain charged through a timer period determined by its magnitude and that of resistor 117, thus holding transistor 115 conducting for a period which by design is made of duration adequate to assure that the control motor has time to drive fully in closing direction, perhaps 15 seconds in this example. If in fact the input in question is attributable to a steady stream condition, the pinching of the flow line resulting from the motor's drive in closing direction will operate to break the steady stream and cause formation of drops, and the first of these drops then will restore the system to its normal control mode. However, if the input is attributable to any cause other than steady stream, as for example the spattering of liquid onto the drop chamber walls, the system may drive full off and then become responsive to "no-drop" signals to step back toward normal operation as previously explained.

From the foregoing it will be apparent that the flow control and intravenous fluid feeding systems of this invention afford reliable protection against the problems of steady stream formation and provide timely warning of light failure or empty flask condition, responding to any such operational irregularity with action toward shutdown of the system until corrective action is taken. System versatility and capability is improved by increased sensitivity to normal drops even of very small size, such as are frequently encountered with the so called "minidrip" systems, which at the same time the system is made insensitive to secondary drops. Finally it will be observed that these several performance and safety advantages all are achieved with little if any additional circuit complexity.

What is claimed as new and desired to be secured by letters patent of the United States is:

1. For regulating fluid flow through a flow line having interposed therein a drop chamber in which flow occurs in the form of discrete drops including primary drops sometimes trailed by smaller secondary drops, apparatus comprising:

drop detection means including a photoelectric sensor element and light source having orientation with respect to said drop chamber such that light from said source traversed the drop chamber and then is incident upon said sensor element except when intercepted by a drop falling through the chamber, said sensor element being responsive to fluctuations in incident light due to said drops to produce an electrical signal output in time synchronism with each thereof;

pulse-generating means having coupled thereto the electrical signal output from said sensing element and being responsive to such sensor signals to generate output pulses synchronized therewith, said pulse-generating means including means responsive to the start of each output pulse to disable the generation of any succeeding pulse through a time period of duration greater than that characteristically separating each primary drop and its trailing secondary drops but substantially smaller than the time period characteristically separating successive primary drops at highest normal flow rate;

fluid flow adjusting means;

and control means responsive to said pulse generator output pulses for actuating said fluid flow adjusting means so as to maintain a predetermined primary drop timing for fluid flow rate control.

2. Fluid flow regulating apparatus as defined in claim 1 wherein said fluid flow adjusting means includes motor means adapted to be driven in both continuous and stepwise modes for accomplishing adjustment of fluid flow rate, and wherein said control means for said motor means includes discriminator means responsive to said pulse generator output pulses to drive said motor means in said stepwise mode for pulse reception rates corresponding to fluid flow rates below the highest normal flow rate and to drive said motor means in said continuous mode for higher pulse repetition rates, whereby flow adjustment is more quickly accomplished when flow rates exceed the highest normal rate.

3. Fluid flow regulating apparatus as defined in claim 1 wherein said apparatus further includes means responsive to operational irregularity to generate an irregularity signal separated in frequency from the frequency of said drop pulses at normal fluid flow rates, wherein said fluid flow adjusting means is operable in a first mode to maintain a predetermined fluid flow rate and operable in a second mode to close off fluid flow, and wherein said control means includes discriminator means having said drop and irregularity signals applied thereto and being responsive to said drop signal to actuate said flow adjusting means in said first mode and responsive to said irregularity signal to actuate said flow adjusting means in said second mode.

4. Fluid flow regulating apparatus as defined in claim 3 wherein said fluid flow adjusting means includes motor means adapted to be driven in stepwise and continuous modes for accomplishing flow rate adjustment in said first and second modes, respectively, and wherein said discriminator means drives said motor means in said stepwise mode in response to drop signals having pulse repetition rates corresponding to fluid flow rates below the highest normal flow rate, and drives said motor means in said continuous mode in response to said irregularity signal and to drop signals having pulse repetition rates exceeding that corresponding to the highest normal flow rate.

5. Fluid flow regulating apparatus as defined in claim 3 wherein said irregularity signal is a pulsed signal of pulse repetition rate substantially higher than the drop signal pulse repetition rate corresponding to highest normal fluid flow rate, and wherein said discriminator means responds to both said irregularity signal and to said drop signal when of pulse repetition rate exceeding that corresponding to highest normal flow rate to actuate said flow adjusting means in said second mode.

6. Fluid flow regulating apparatus as defined in claim 3 wherein said irregularity signal is a DC signal and wherein said discriminator means responds to both said DC irregularity signal and to said drop signal when of pulse repetition rate exceeding that corresponding to highest normal fluid flow rate to actuate said flow-adjusting means in said second mode.

7. Fluid flow regulating apparatus as defined in claim 3 wherein the operational irregularity of which said irregularity signal is indicative of a continuing change in level of illumination of said sensor element such as occasioned by the fall of a steady stream of liquid through the drop chamber, and wherein said irregularity signal generating means further includes means for limiting the maximum duration of said irregularity signal when generated in response to such continuing change in sensor illumination.

8. Fluid flow regulating apparatus as defined in claim 3 wherein the operational irregularity of which said irregularity signal is indicative is failure of said light source, and wherein such failure is detected by sensing its affect on the electrical signal output of said photoelectric sensor element.

9. Fluid flow regulating apparatus as defined in claim 3 wherein normal operation said drop chamber maintains a pool of liquid therein and wherein the operational irregularity sensed is a fall in level of such pool, and further including:

a second photoelectric sensor element and sight source having orientation with respect to said drop chamber such that light from said source traverses the drop chamber below the normal level of said pool and in the absence thereof then is incident upon said sensor element;

and means operative under control of said second photoelectric sensor for generating said irregularity signal upon illumination of said sensor element due to absence of said pool.

10. Fluid flow regulating apparatus as defined in claim 9 wherein said drop chamber comprises a tubular member having a vertical axis and a closed lower end in which is maintained said liquid pool, and wherein the line of sight between said second photoelectric sensor element and its light source as substantially displaced from said drop chamber vertical axis, whereby light from said source will illuminate said sensor element in the absence of said pool but in the presence thereof will not illuminate the sensor element because defected by refraction and attenuated by absorption in the liquid of the pool.

11. For regulating fluid flow through a flow line having interposed therein a drop chamber in which flow occurs in the form of discrete drops including primary drops sometimes trailed by smaller secondary drops, apparatus comprising:

drop detection means including a photoelectric sensor element and light source having orientation with respect to said drop chamber such that light from said source traverses the drop chamber and then is incident upon said sensor element except when intercepted by a drop falling through the chamber, said sensor element being responsive to fluctuations in incident light due to said drops to produce an electrical signal output in time synchronism with each thereof;

pulse-generating means having coupled thereto the electrical signal output from said sensor element and being responsive thereto to produce a series of output pulses each having its leading edge in time coincidence with a primary drop and being of time duration greater than the time spacing characteristically separating separating each primary drop and any associated secondary drops but substantially smaller than the time period characteristically separating successive primary drops at highest normal flow rate;

and control means responsive to leading edge timing of said pulse generator output pulses and independent of the time duration of said pulses for actuating said fluid flow adjusting means so as to maintain predetermined primary drop timing for fluid flow rate control.

12. Fluid flow regulating apparatus as defined in claim 11 wherein said drop signal constitutes a first control signal, wherein there is included means for generating a second control signal separated in frequency from said first signal and indicating an operating condition accommodation to which entails actuation of said fluid flow adjusting means in flow decreasing direction, and wherein said control means further includes discriminator means having applied thereto said first and second signals and being responsive to said first signal to actuate said flow-adjusting means in whichever direction necessary to maintain desired fluid flow rate and responsive to said second signal to actuate said flow-adjusting means to drive only in flow-decreasing direction.

13. For regulating fluid flow through a flow line having interposed therein a drop chamber in which flow occurs in the form of discrete drops, apparatus comprising:

a drop detector responsive to said drops to produce an output signal comprising pulses each beginning in time synchronism with a drop;

fluid flow adjusting means including motor means adapted to be driven in both continuous and stepwise modes for accomplishing adjustment of fluid flow rate through said flow line;

first and second control signal generating means having as an input the drop pulse output of said drop detector and being responsive thereto to generate a first control signal for drop pulse repetition rates corresponding to fluid flow rates below the highest normal rate and to generate a second control signal for drop pulse repetition rates above sad highest normal rate;

and control means for said motor means having said first and second control signals applied thereto and being responsive to said first control signal to drive motor mean in said stepwise mode except on occurrence of said second control signal and being responsive thereto to drive said motor means in said continuous mode, whereby flow adjustment is more quickly accomplished when flow rates exceed the highest normal rate.

14. Fluid flow regulating apparatus as defined in claim 13 further including means responsive to operational irregularity to transmit to said control means an irregularity signal separated in frequency from said drop signal at normal fluid flow rates, and wherein said control means is responsive to said irregularity signal to drive said motor means in said continuous mode upon occurrence of such signal.

PO-1050
(5/69)

UNITED STATES PATENT OFFICE
CERTIFICATE OF CORRECTION

Patent No. 3,609,379            Dated September 28, 1971

Inventor(s) Herbert John Hildebrandt

It is certified that error appears in the above-identified patent and that said Letters Patent are hereby corrected as shown below:

Column 4, line 39, after "output" insert --of--. Column 5, line 5, change "gage" to --gate--; line 12, after "duration" insert --of the multivibrator pulse. Since each multivibrator pulse is of duration--; line 14, change "timer" to --time--; line 29, change "it" to --its--. Column 6, line 33, change "the", third occurrence, to --these--. Column 8, line 70, change "even" to --event--. Column 9, line 4, after "off" insert --and--. Column 10, line 23, change "for" to --by--; line 64, after "199" insert --and--. Column 11, line 72, change "257" to --275--. Column 12, line 4, delete "on" and insert --to--; line 9, after "question" insert --is--; line 18, after "lead" insert --197 will be substantially higher than the fixed reference voltage on lead--; line 53, after "value" insert --of--; line 69, change "transistors" to --transistor--. Column 13, line 12, change "on conduction" to --in conducting--; line 47, change "310" to --301--; line 48, change "198" to --189--; line 54, change "resistor" to --transistor--. Column 14, line 27, delete "employ" and insert --or empty--; line 51, change "lever" to --level--; line 52, after "drop" insert --and--; line 70, change "timer" to --time--. Column 15, line 31, change "sill" to --will--. Column 16, line 1, after "empty" insert --bottle--; line 13, after "drop" insert --in--. Column 17, line 10, after "voltage" insert --on terminal 105 will shortly be followed by a negative-going voltage--; line 12, change "397" to --379--; line 19, change "timer" to --time--; line 44, change "which" to --while--; line 57, change "traversed" to --traverses--; line 65, change "sensing" to --sensor--. Column 19, line 18, change "defected" to --deflected--; line 39, delete "separating" second occurrence; between lines 43 and 44, insert an additional line reading --fluid flow adjusting means;--; line 47, after "maintain" insert --a--. Column 20, line 31, change "sad" to --said--; line 34, after "drive" insert --said--; line 34, change "mean" to --means--.

Signed and sealed this 21st day of November 1972.

(SEAL)
Attest:

EDWARD M. FLETCHER, JR.
Attesting Officer

ROBERT GOTTSCHALK
Commissioner of Patents